United States Patent [19]
Kim

[11] Patent Number: 5,612,738
[45] Date of Patent: Mar. 18, 1997

[54] SYSTEM AND METHOD FOR COMPENSATING FOR COLOR DEVIATION IN AN IMAGE PRODUCED BY AN IMAGE CAPTURING AND REPRODUCING APPARATUS SUCH AS CAMERA

[75] Inventor: Hoo-shik Kim, Kyounggi-do, Rep. of Korea

[73] Assignee: Samsung Aerospace Industries, Ltd., Kyeongsangnam-do, Rep. of Korea

[21] Appl. No.: 512,160

[22] Filed: Aug. 7, 1995

[30] Foreign Application Priority Data

Aug. 12, 1994 [KR] Rep. of Korea .................... 94-19933

[51] Int. Cl.$^6$ ..................................................... H04N 9/73
[52] U.S. Cl. ........................................... 348/223; 348/227
[58] Field of Search .................................. 348/223, 225, 348/655, 656, 224, 227; H04N 9/73

[56] References Cited

U.S. PATENT DOCUMENTS 5,283,632  1/1994  Suzuki et al. ........................ 348/223
5,289,268  2/1994  Suzuki et al. ........................ 348/223

*Primary Examiner*—Glenton B. Burgess
*Attorney, Agent, or Firm*—Finnegan, Henderson, Farabow, Garrett & Dunner, L.L.P.

[57] ABSTRACT

A system for compensating for color deviation in image light of an object obtained by an image capturing and reproducing apparatus, which comprises a color temperature measuring circuit for detecting the color temperature of the light rays around the object, a color coordinate operation circuit for processing the color data generated by the color temperature measuring circuit so as to obtain color coordinates, a control circuit for obtaining a color deviation compensation value, based on the color coordinates to produce a color deviation compensation signal, and a color compensation circuit for supplying color deviation compensated image light to the image capturing and reproducing apparatus responsive to the color deviation compensation signal.

21 Claims, 9 Drawing Sheets

No Applied Field

Light

Liquid Crystal Molecules

Applied Field

Light

Liquid Crystal Molecules

FIG. 9A

| nm | Y (Single) | Y (Parallel) | Y (Perpendicular) | ρ (Polarization Degree) | nm | Y (Single) | Y (Parallel) | Y (Perpendicular) | ρ (Polarization Degree) |
|---|---|---|---|---|---|---|---|---|---|
| 400 | 24.6 | 10.8 | 1.86 | 84.0 | 560 | 44.6 | 36.5 | 3.22 | 91.5 |
| 410 | 37.2 | 24.4 | 3.61 | 86.1 | 570 | 45.1 | 36.8 | 3.82 | 90.1 |
| 420 | 41.2 | 30.3 | 3.96 | 87.7 | 580 | 45.4 | 36.9 | 4.12 | 89.4 |
| 430 | 42.3 | 32.3 | 3.79 | 88.9 | 590 | 45.4 | 36.9 | 3.85 | 90.1 |
| 440 | 42.7 | 33.0 | 3.72 | 89.3 | 600 | 45.4 | 36.9 | 3.45 | 91.0 |
| 450 | 43.2 | 33.7 | 3.88 | 89.1 | 610 | 45.4 | 36.9 | 3.14 | 91.8 |
| 460 | 43.6 | 34.2 | 4.05 | 88.8 | 620 | 45.5 | 36.9 | 2.89 | 92.4 |
| 470 | 43.9 | 34.6 | 4.08 | 88.8 | 630 | 45.6 | 37.0 | 2.76 | 92.8 |
| 480 | 44.0 | 34.9 | 3.99 | 89.1 | 640 | 45.9 | 37.1 | 2.98 | 92.3 |
| 490 | 44.1 | 35.2 | 3.81 | 89.7 | 650 | 46.7 | 37.3 | 3.77 | 90.4 |
| 500 | 44.3 | 35.6 | 3.47 | 90.7 | 660 | 48.0 | 37.8 | 5.43 | 86.5 |
| 510 | 44.5 | 35.9 | 3.20 | 91.4 | 670 | 49.8 | 38.3 | 7.98 | 81.0 |
| 520 | 44.7 | 36.1 | 3.27 | 91.3 | 680 | 51.6 | 38.9 | 10.78 | 75.2 |
| 530 | 44.9 | 36.4 | 3.41 | 91.0 | 690 | 52.9 | 39.3 | 13.18 | 70.6 |
| 540 | 44.7 | 36.4 | 3.20 | 91.6 | 700 | 53.6 | 39.8 | 14.91 | 67.4 |
| 550 | 44.5 | 36.4 | 2.97 | 92.1 | | | | | |

FIG.9B

Light Source (D65) Field ( 2° )

|     |         |       |      |
|-----|---------|-------|------|
| X=  | 42.70   | 34.35 | 3.43 |
| Y=  | 44.92   | 36.44 | 3.46 |
| Z=  | 46.86   | 36.39 | 4.20 |

Y(Transmission Rate) = 44.92 (%)

|      |       |       |       |
|------|-------|-------|-------|
| L*=  | 72.84 | 66.86 | 21.81 |
| a*=  | 0.03  | -0.98 | 2.28  |
| b*=  | 2.17  | 4.07  | -2.41 |

P(Average Polarization) = 90.91(%)

Light Source (C) Field ( 2° )

|     |       |       |       |
|-----|-------|-------|-------|
| X=  | 44.05 | 35.42 | 3.55  |
| Y=  | 44.93 | 36.44 | 3.47  |
| Z=  | 50.92 | 39.55 | 4.57  |

Y(Transmission Rate) = 44.93 (%)

|      |       |       |       |
|------|-------|-------|-------|
| L*=  | 72.84 | 66.86 | 21.84 |
| a*=  | -0.01 | -1.07 | 2.32  |
| b*=  | 2.14  | 4.02  | -2.37 |

P(Average Polarization) = 90.89(%)

SYSTEM AND METHOD FOR COMPENSATING FOR COLOR DEVIATION IN AN IMAGE PRODUCED BY AN IMAGE CAPTURING AND REPRODUCING APPARATUS SUCH AS CAMERA

TECHNICAL BACKGROUND

The present invention concerns a system for compensating for color deviation in an image produced by an image capturing and reproducing apparatus such as a camera.

Conventionally an image capturing and reproducing apparatus such as a color charge coupled device (CCD) camera contains an auto white balance function to compensate for color deviation in an image taken. This function electrically balances the intensities of the green color component, red color component, and blue color component of the image signal so that the reproduced image will have a reproduced color similar to the original color of the object.

FIG. 1 for illustrates a conventional electronic auto white balance system, wherein a camera 11 is connected to an image processing circuit 12, which in turn is connected to color separation circuit 13 for separating the video signal from the image processing circuit 12 into a green, red and blue signal. Also included is a video a signal synthesizing and comparing circuit 14 for balancing the green, red and blue signal. In operation, the output signals of the camera 11 are applied to the image processing circuit 12, which generates a video signal to be separated by the color separation circuit 13 into green, red and blue signals. The green, red and blue signals from the synthesizing and comparing circuit 14 are then again applied to the image processing circuit 12. This conventional system makes the sum of all the color vectors white, in order to obtain a balanced image with respect to the whole screen. However, if the original image contains predominant proportions of certain colors compared to other colors, an unbalanced combination of color vectors is produced which reduces the gain of the predominant colors only, so that the predominant colors as reproduced, are considerably different from the original object colors.

Another conventional way to compensate for color deviation is to use color filters, as shown in FIG. 2. The colors of a picture taken by a silver halide camera 22 are considerably affected by weather. The color temperature appears at more than 7000K in the morning, giving bluish colors, or on a cloudy day appearing with a low temperature of about 5000K, giving reddish colors. In order to eliminate such drawbacks, a variety of color filters 21 are used when taking a picture with the silver halide camera. However, the filters are selected depending on the user's experience and the replacement of a filter is tedious work. Moreover, the number of available filters is too limited to satisfactorily compensate for all color deviations. In addition, a filter can not be mounted on a camera without a filter adapter such as a compact camera with a lens shutter.

SUMMARY OF THE INVENTION

Accordingly, it is an object of the present invention to provide a system for compensating for color deviation in an image produced by an image capturing and reproducing apparatus, such asa camera, such that the image will be reproduced in almost natural colors.

It is another object of the present invention to provide a means for eliminating the influence of ambient color temperature in the scene photographed.

To achieve these and other objects in accordance with the invention, as embodied and broadly described, the invention includes a system for compensating for color deviation in image light of an object obtained by an image capturing and reproducing apparatus. The system comprises color temperature measuring means for detecting a color temperature of light rays incident upon said object and generating corresponding color temperature data. The system further comprises color coordinate operation means for processing the color temperature data so as to obtain color coordinates and control means for obtaining a color deviation compensation value based on said color coordinates to produce a color deviation compensation signal and color compensation means controlled by said color deviation compensation signal, for supplying color deviation compensated image light to the image capturing and reproducing apparatus.

In one aspect of the present invention, the color compensation means comprises a liquid crystal section for turning the polarized plane of polarized light according to the color deviation compensation signal, an incident light polarizing filter mounted on the front of the liquid crystal section for polarizing unpolarized light, and a light transmission control polarizing filter mounted on the back of the liquid crystal section for controlling the transmission of the polarized light with the polarized plane turned by the liquid crystal section so as to provide the color deviation compensated light. The liquid crystal section includes a pair of transparent electrodes attached to one side thereof to apply a voltage to the liquid crystal in order to change its molecular orientation, thereby turning the polarized plane. Each of the transparent electrodes is interposed between one of the polarizing filters and the liquid crystal section. The molecular orientation of the liquid crystal is controlled by the color deviation compensation signal.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate several embodiments of the invention and together with the description serve to explain the principles of the invention.

BRIEF DESCRIPTION OF THE ATTACHED DRAWINGS

FIGS. 9A & 9B are tables showing the physical properties of conventional iodide polarizing filters according to the polarization degree;

DETAILED DESCRIPTION OF THE PREFERRED EMBODIMENTS

Figure 1:
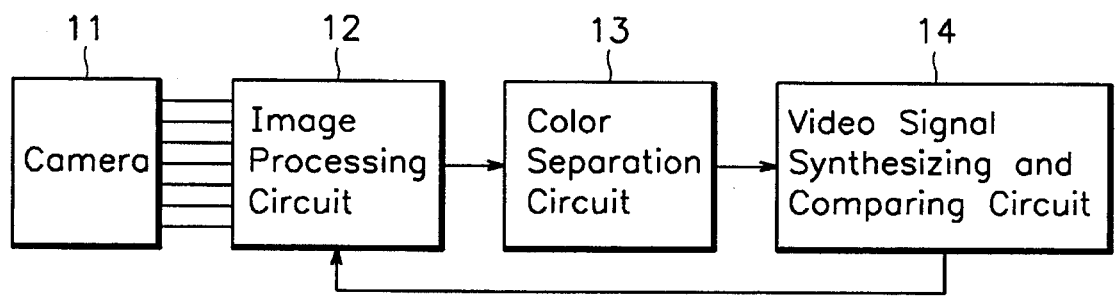
FIG. 1 is a block diagram illustrating a conventional electronic auto white balance system.
Figure 2:
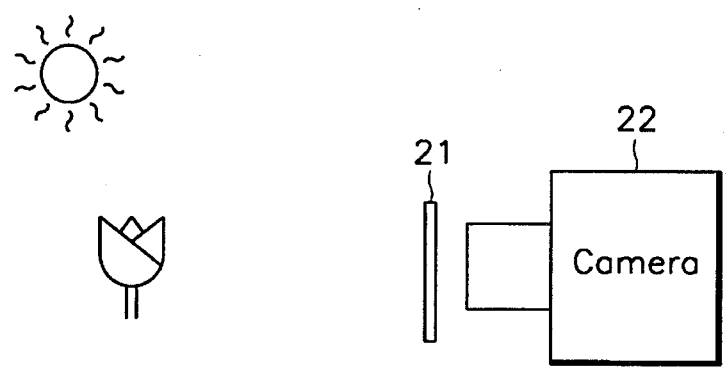
FIG. 2 is a schematic side view illustrating the use of a conventional color filter when photographing with a conventional silver halide camera.
Figure 3:
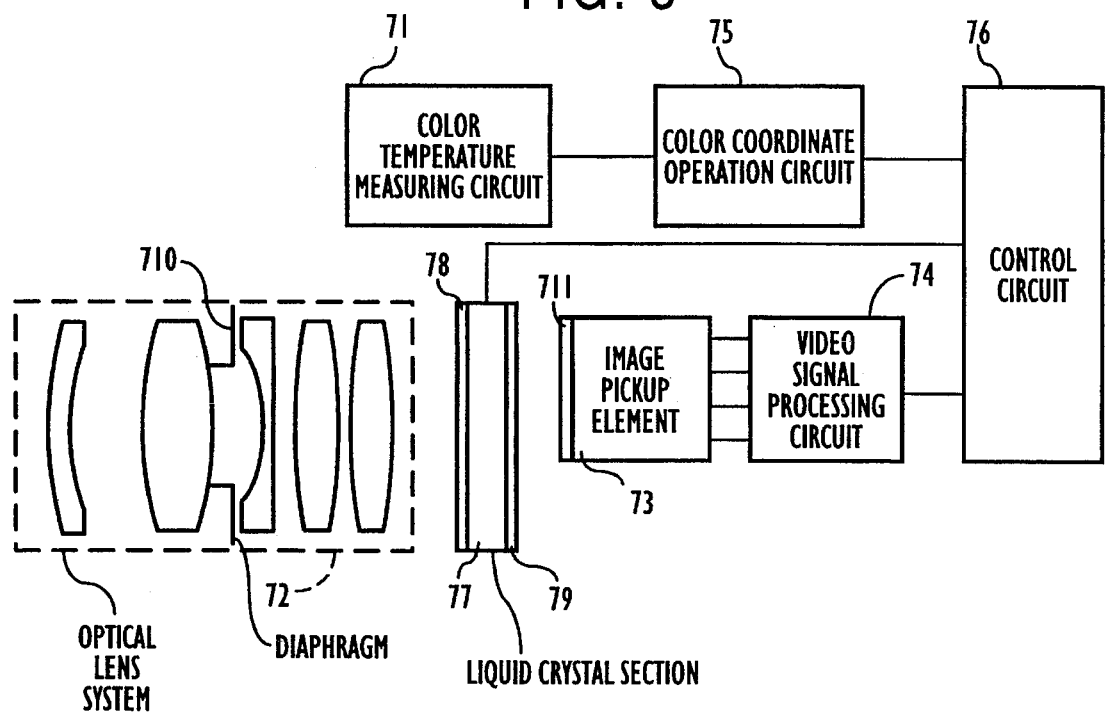
FIG. 3 is a schematic block diagram illustrating a system for compensating for color deviation in an image taken according to a first embodiment of the present invention.

According to a first embodiment of the present invention seen in FIG. 3, a system for compensating for color deviation in an image of an object obtained by an image capturing and reproducing apparatus such as a camera, includes a color temperature measuring circuit 71 for detecting the color temperature of light rays around an object photographed, that is, light rays incident upon the object photographed. A color coordinate operation circuit 75 is connected to the color temperature measuring circuit 71 to process the color data generated by the color temperature measuring circuit 71 so as to produce color coordinates. The color coordinate operation circuit 75 is connected to a control circuit 76 for obtaining a color deviation compensation value, based on the color coordinates, to produce a color deviation compensation signal. A liquid crystal section 77, including a pair of polarizing filters 78 and 79, is connected to the control circuit 76, which is also connected to a video signal processing circuit 74. Positioned behind the liquid crystal section 77 is an image pickup element 73 having a shutter. The incident light polarizing filter 78 is mounted on the front of the liquid crystal section 77 for polarizing unpolarized light, and the light transmission control polarizing filter 79 on the back of the liquid crystal section controls the transmission of the polarized light. The liquid crystal section 77 is coupled to an optical lens system 72 containing a diaphragm 710 for controlling the exposure to light.

Figure 4:
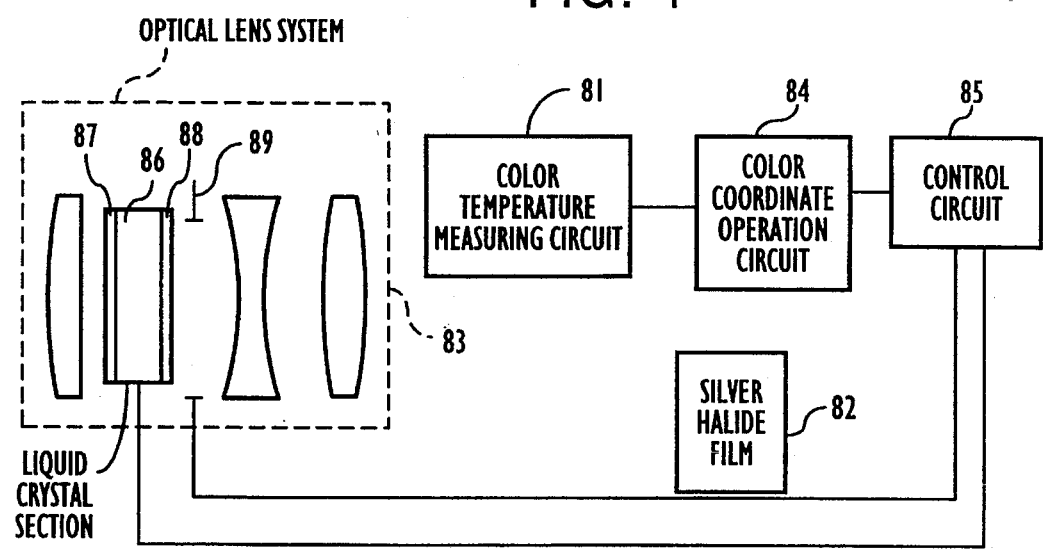
FIG. 4 is a schematic block diagram illustrating a system for compensating for color deviation in an image taken according to a second embodiment of the present invention.

A color deviation compensating system according to a second embodiment of the present invention as shown in FIG. 4 includes a color temperature measuring circuit 81 connected to a color coordinate operation circuit 84. A control circuit 85 is used to obtain a color deviation compensation value based on the color coordinates to produce a color deviation compensation signal. The control circuit 85 is connected to a liquid crystal section 86 and a diaphragm/ shutter 89. Between the diaphragm/shutter 89 and the liquid crystal section 86 is mounted a light transmission control polarizing filter 88. An incident light polarizing filter 87 is mounted on the front of the liquid crystal section 86. A silver halide film 82 is also provided in order to record the image taken by the optical lens system.

Figure 5:
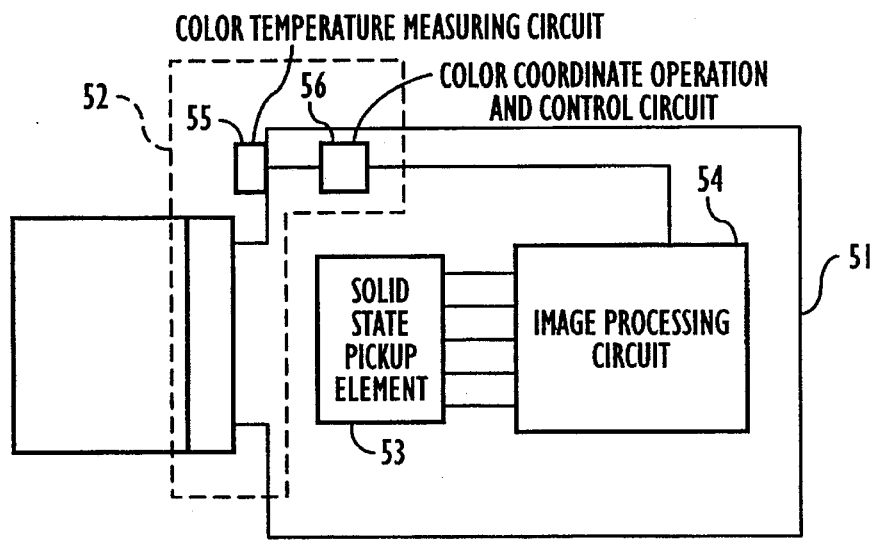
FIG. 5 is a schematic block diagram illustrating the structure of a camera provided with the color deviation compensation system according to a third embodiment of the present invention.

A camera with a color deviation compensating system according to a third embodiment of the present invention is shown in FIG. 5 to include a color compensation circuit 52, a solid state pickup element 53, and an image processing circuit 54. The color compensation circuit 52 also includes a color temperature measuring circuit 55 and a color coordinate operation and control circuit 56. The solid state pickup element 53 includes an electronic shutter and picks up the color compensated image to produce a video signal. The image processing circuit 54 reproduces the image by processing the video signal.

Figure 6:
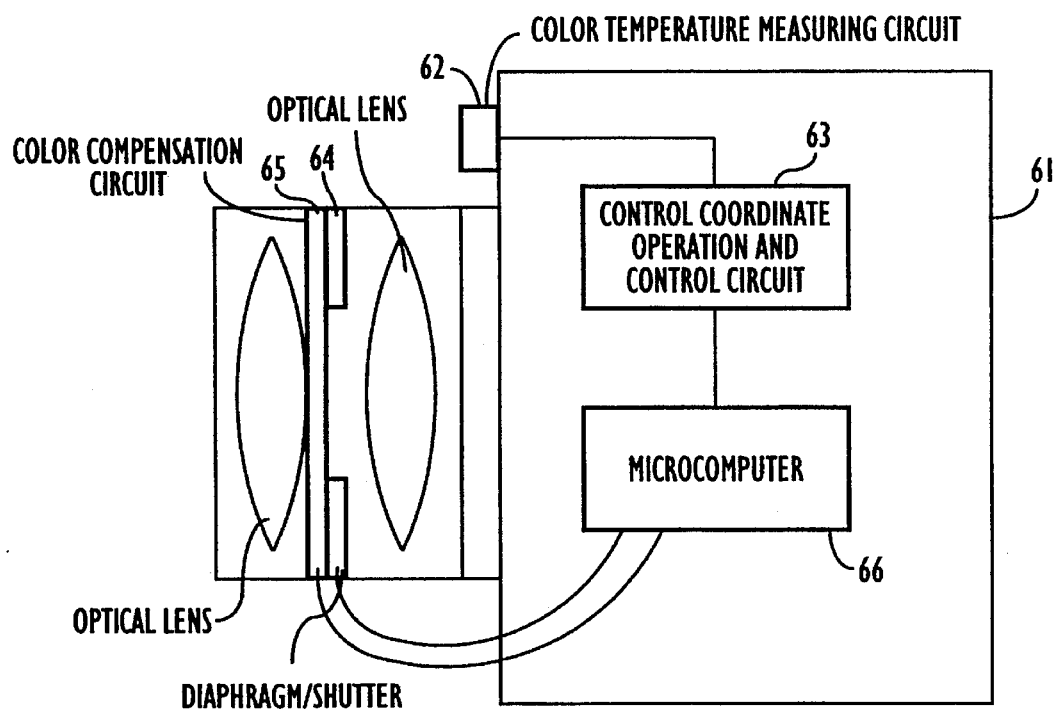
FIG. 6 is a schematic block diagram illustrating the structure of a camera provided with a color deviation compensation system according to a fourth embodiment of the present invention.

FIG. 6 schematically illustrates another camera structure embodiment. A camera 61 includes a color temperature measuring circuit 62, a control coordinate operation and control circuit 63, a color compensation circuit 65 having a diaphragm/shutter 64, and a microcomputer 66 for controlling all of its components including the color compensation circuit 65.

Figure 7:
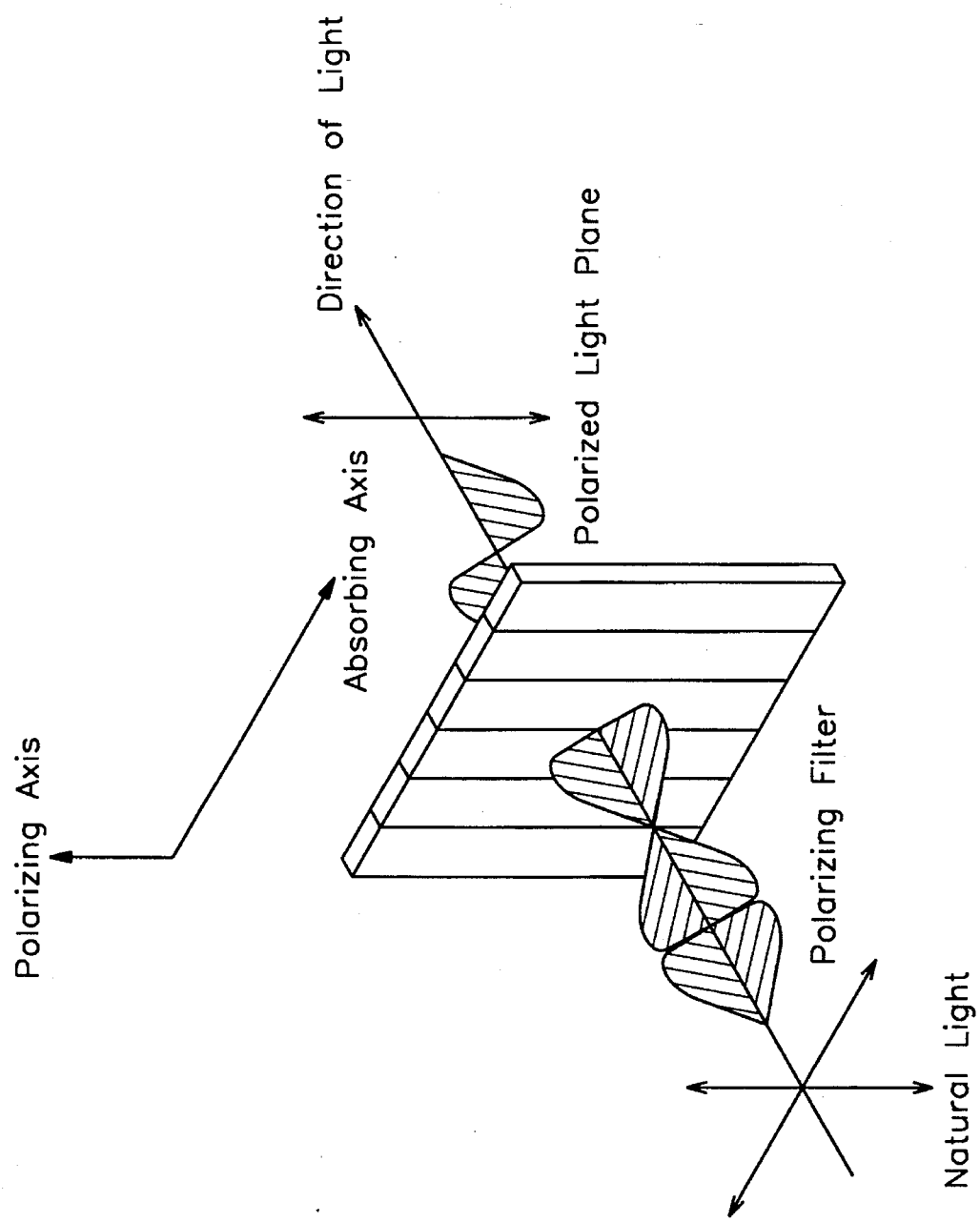
FIG. 7 is a schematic diagram illustrating a physical property of a polarizing filter.
Figure 8A:
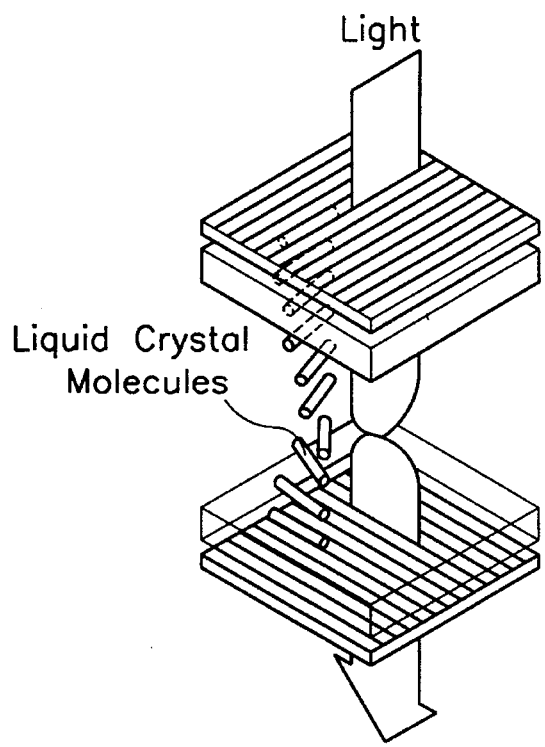
FIG. 8A is a schematic diagram illustrating the structure of the liquid crystal interposed between a pair of polarizing filters without an applied electric voltage.
Figure 8B:
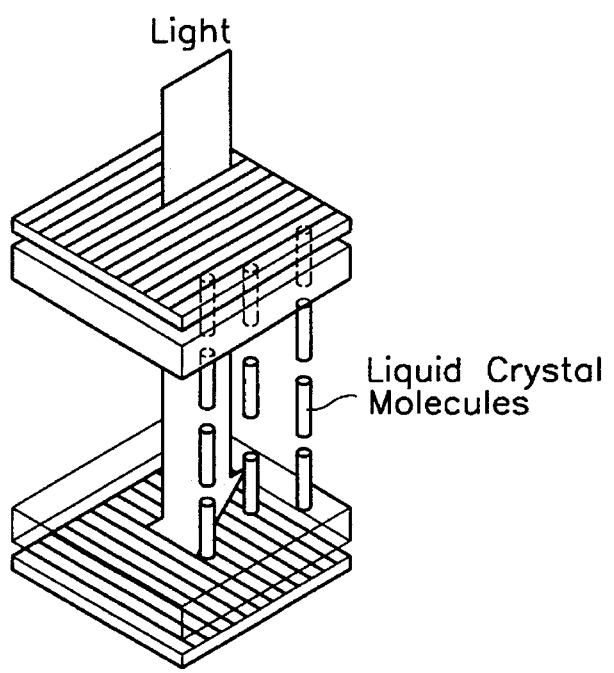
FIG. 8B is a schematic diagram illustrating the structure of the liquid crystal of FIG. 8A with an applied electric voltage.
Figure 10:
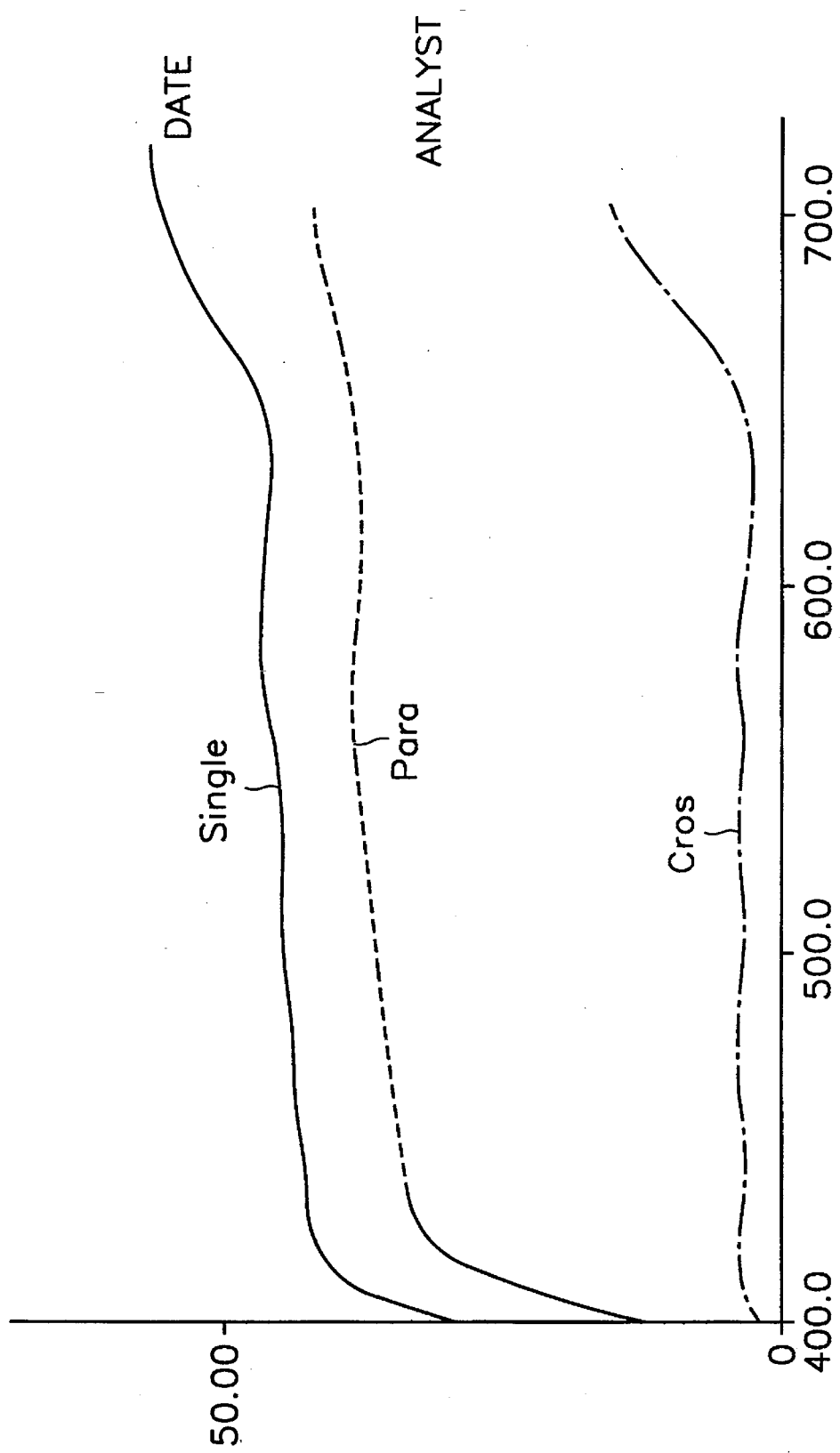
FIG. 10 is a graph illustrating the changes in color transmission through conventional iodide polarizing filters according to the polarization degree.

Before describing the operation of the invention embodiments, a description of the role of the liquid crystal section and polarizing filters is provided to help in understanding of the present invention. Referring to FIGS. 7 to 9, the polarizing filters plane-polarize the incident light, as shown in FIG. 7, and the role of the liquid crystal section associated with the polarizing filters is shown in FIGS. 8A and 8B. Referring to FIGS. 8A and 8B, the liquid crystal layer is positioned between a pair of transparent electrodes, the outer surfaces of which are each associated with a polarizing filter. The filters are arranged with the polarizing axes being perpendicular to each other. The liquid crystal layer is designed such that their molecular orientation turns the polarized plane of the polarized light by 90? when no voltage is applied to the transparent electrodes, so that the polarized light passing through the upper polarizing filter is almost all passed through the lower polarizing filter, as shown in FIG. 8A. But if a voltage is applied to the transparent electrodes, the molecular orientation of the liquid crystal is changed according to the magnitude of the voltage, so that the liquid crystal turns the polarized plane of the light polarized by the upper polarizing filter in proportion to the molecular orientation change. Then, a portion of the polarized light is blocked by the lower polarizing filter.

FIGS. 9A and 9B show color variations made by a conventional iodide polarizing filter. With the light source D65, the color coordinates in parallel transmission are $L^*=66.86$, $a^*=-0.98$, and $b^*=4.07$, indicating a green color, and the color coordinates in perpendicular transmission $L^*=21.81$, $a^*=2.28$, $b^*=-2.41$, indicating purple color.

Figure 11:
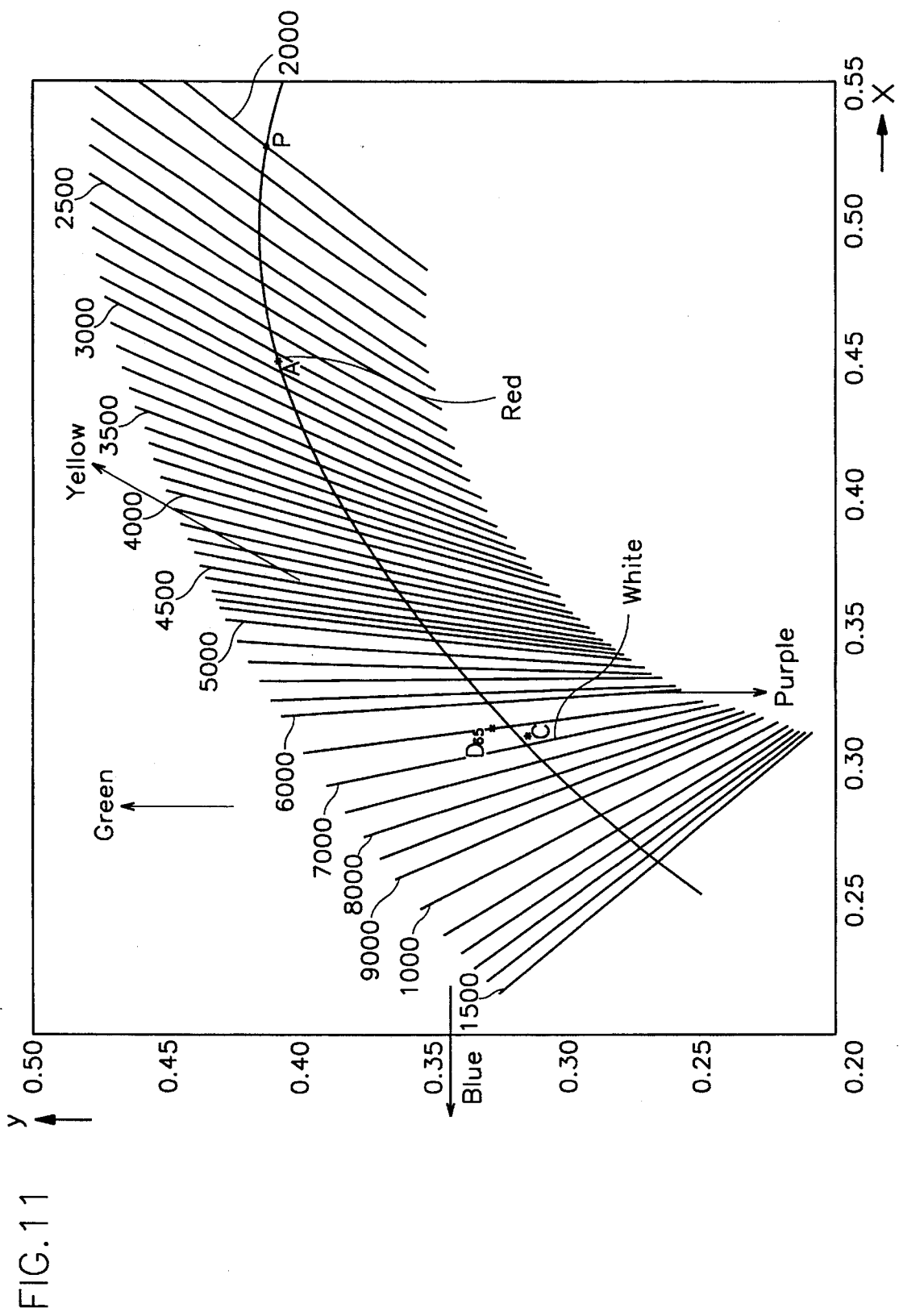
FIG. 11 is a graph illustrating the relationship between color coordinates and color temperature of conventional iodide polarizing filters.

When the camera with the inventive system is operated, the color temperature measuring circuit 71 measures the color temperature, which the color coordinate operation circuit 75 compares with the black body radiation to calculate the color coordinates. For example, if the measured color temperature is 2,000K, the color coordinates are determined as $x=0.525$ and $y=0.415$ according to the graph as shown in FIG. 11. These coordinates represent a color close to reddish yellow requiring a color compensation toward indigo. Hence, the control circuit 76 applies to the liquid crystal section 77 a voltage to change the molecular orientation so that the combination of the liquid crystal section and the polarizing filters may filter the polarized light in conformity with the color coordinates $L^*=5.0$, $a^*=1.0$, $b^*=-2.5$, obtained by experiments. Thus, a color close to indigo is produced to compensate for the color deviation caused by the condition of the light source used when photographing. Namely, the color deviation is automatically compensated based on the color coordinates of the light source (C) used when photographing (See FIG. 9B). In addition, considering the FIG. 3 embodiment, the diaphragm 710 is opened, and the speed of the shutter 711 is reduced so as to compensate for the reduced light transmission rate (100% to 5%).

In the embodiment of FIG. 5, when the camera 51 is operated, the color temperature measuring circuit 55 measures the color temperature around the object photographed. The color coordinate operation and control circuit 56 operates on the color temperature in order to provide the compensating value required for the liquid crystal and polarizing filters. The compensated image is transferred by the solid state image pickup element 53 to the image processing circuit 54, thus reproducing the natural color. In the embodiment of FIG. 6, when the camera 61 is operated, color deviation is compensated by the color deviation compensation circuit 65, controlled by the microcomputer 66 to reproduce the natural color.

The apparatus and methods described above comprise preferred embodiments of the present invention. However, it will be apparent to those skilled in the art that various modifications and variations can be made in the apparatus and methods of this invention without departing from the spirit or scope of the present invention. The present invention covers such modifications and variations which are within the scope of the appended claims and their equivalents.

What we claimed is:

1. A system for compensating for color deviation in image light of an object obtained by an image capturing and reproducing apparatus, comprising:

color temperature measuring means for detecting a color temperature of light rays incident upon said object and generating corresponding color temperature data;

color coordinate operation means for processing the color temperature data so as to obtain color coordinates;

control means for obtaining a color deviation compensation value based on said color coordinates to produce a color deviation compensation signal; and color compensation means for compensating the color deviation of the image light from the object by modulating polarization of the image light in response to said color deviation compensation signal, and for supplying color deviation compensated image light to the image capturing and reproducing apparatus.

2. The system for compensating for color deviation as defined in claim 1, wherein said color compensation means comprises:

a first incident light polarizing filter for polarizing the image light from the object;

a liquid crystal section mounted in back of the incident light polarizing filter for rotating a polarized plane of polarized light according to said color deviation compensation signal; and a second light transmission control polarizing filter mounted in back of said liquid crystal section for controlling transmission of the image light in the polarized plane rotated by said liquid crystal section, so as to provide said color deviation compensated image light.

3. The system for compensating for color deviation as defined in claim 2, further comprising a pair of transparent electrodes positioned to apply a voltage to the liquid crystal section in order to change a molecular orientation thereof, thereby rotating said polarized plane.

4. The system for compensating for color deviation as defined in claim 3, wherein said transparent electrodes are respectively positioned between said first and second polarizing filters and said liquid crystal section.

5. The system for compensating for color deviation as defined in claim 2, wherein a molecular orientation of said liquid crystal section is controlled by said color deviation compensation signal.

6. The system for compensating for color deviation as defined in claim 3, wherein the molecular orientation of said liquid crystal section is controlled by said color deviation compensation signal.

7. The system for compensating for color deviation as defined in claim 4, wherein the molecular orientation of said liquid crystal section is controlled by said color deviation compensation signal.

8. A camera for taking a photograph of an object, comprising:

a color temperature measuring circuit for detecting a color temperature of light rays incident upon said object and generating color temperature data;

an optical lens system for capturing image light of said object;

means for positioning silver halide film in an image plane for recording said captured image light;

color coordinate operation means for processing the color temperature data so as to obtain color coordinates;

control means for obtaining a color deviation compensation value based on said color coordinates to produce a color deviation compensation signal;

color compensation means for compensating the color deviation of the image light from the object by modulating polarization of the image light in response to said color deviation compensation signal, and for supplying color deviation compensated image light to said diaphragm/shutter for controlling light exposure of said film.

9. The camera as defined in claim 8, wherein said color compensation means comprises:

a first incident light polarizing filter for polarizing the image light from the object;

a liquid crystal section mounted in back of the first incident light polarizing filter for rotating a polarized plane of polarized image light according to said color deviation compensation signal; and a second light transmission control polarizing filter mounted in back of said liquid crystal section for controlling transmission of the polarized image light with the polarized plane rotated by said liquid crystal section so as to provide said color deviation compensated image light.

10. The camera as defined in claim 9, further comprising a pair of transparent electrodes positioned to apply a voltage to the liquid crystal section in order to change a molecular orientation thereof, thereby rotating said polarized plane.

11. The camera for compensating for color deviation as defined in claim 10, wherein said transparent electrodes are respectively positioned between said first and second polarizing filters and said liquid crystal section.

12. The camera for compensating for color deviation as defined in claim 9, wherein a molecular orientation of said liquid crystal is controlled by said color deviation compensation signal.

13. The camera for compensating for color deviation as defined in claim 10, wherein the molecular orientation of said liquid crystal is controlled by said color deviation compensation signal.

14. The camera for compensating for color deviation as defined in claim 11, wherein the molecular orientation of said liquid crystal is controlled by said color deviation compensation signal.

15. A camera for taking a photograph of an object, comprising:
- a color temperature measuring circuit for detecting color temperature of light rays incident upon said object and generating color temperature data;
- an optical lens system for capturing image light of said object;
- an image pickup element for converting the captured image light into an electrical signal;
- an image processing circuit for producing a video signal according to the electrical signal received from said image pickup element;
- color coordinate operation means for processing the color temperature data so as to obtain color coordinates;
- a control means for obtaining a color deviation compensation value based on said color coordinates to produce a color deviation compensation signal;
- a color compensation means for compensating the color deviation of the image light from the object by modulating polarization of the image light in response to said color deviation compensation signal, and for supplying color deviation compensated image light to said image pickup element; and
- a diaphragm/shutter for controlling light exposure to said image pickup element.

16. The camera as defined in claim 15, wherein said color compensation means comprises:
- a first incident light polarizing filter for polarizing the image light from the object;
- a liquid crystal section mounted in back of the incident light polarizing filter for rotating the polarized plane of polarized image light according to said color deviation compensation signal; and
- a second light transmission control polarizing filter mounted in back of said liquid crystal section for controlling the transmission of the polarized image light with the polarized plane rotated by said liquid crystal section so as to provide said color deviation compensated image light.

17. The camera as defined in claim 16, further comprising a pair of transparent electrodes positioned to apply a voltage to the liquid crystal section in order to change a molecular orientation thereof, thereby rotating said polarized plane.

18. The camera for compensating for color deviation as defined in claim 17, wherein said transparent electrodes are respectively positioned between said first and second polarizing filters and said liquid crystal section.

19. A camera for compensating for color deviation as defined in claim 16, wherein a molecular orientation of said liquid crystal is controlled by said color deviation compensation signal.

20. A camera for compensating for color deviation as defined in claim 17, wherein the molecular orientation of said liquid crystal is controlled by said color deviation compensation signal.

21. A camera for compensating for color deviation as defined in claim 18, wherein the molecular orientation of said liquid crystal is controlled by said color deviation compensation signal.

* * * * *